T. B. CAROTHERS.
Devices for Steaming Oil-Wells.
No. 5,659. Reissued Nov. 18, 1873.
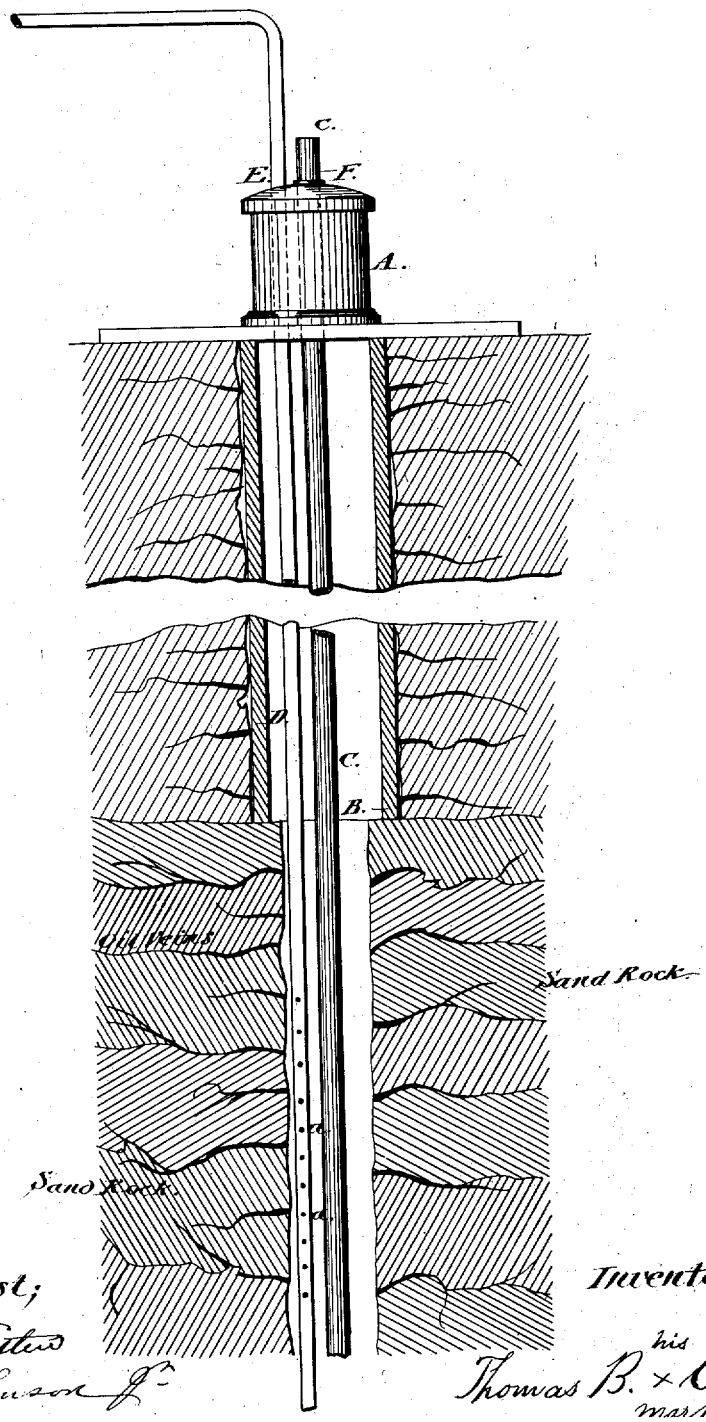
Attest;
C. L. Carter
John Johnson Jr.
Inventor;
Thomas B. his × Carothers mark

UNITED STATES PATENT OFFICE.

THOMAS B. CAROTHERS, OF OIL CITY, PENNSYLVANIA.

IMPROVEMENT IN DEVICES FOR STEAMING OIL-WELLS.

Specification forming part of Letters Patent No. 139,656, dated June 10, 1873; reissue No. 5,659, dated November 18, 1873; application filed July 15, 1873.

*To all whom it may concern:*

Be it known that I, THOMAS B. CAROTHERS, of Oil City, in the county of Venango and State of Pennsylvania, have invented a new and useful Improvement in Device for Steaming Oil-Wells; and I do hereby declare the following to be a full, clear, and exact description of the same, such as will enable others skilled in the art to which it pertains to make and use it, reference being had to the accompanying drawings, which form part of my specification.

In the drawing is shown a vertical section of an oil-well, with my invention in side elevation.

My invention relates to the clearing of clogged fissures and veins in oil-wells by means of steam directly applied thereto; and it consists in introducing an additional pipe, D, through the casing-head A of an oil-well, said pipe being parallel with the tubing C, which tubing also passes through the casing-head A. The casing-head A is provided with separate openings for the passage of the tubing C and pipe D. The pipe D is introduced within the casing B and outside of the tubing C. The steam-pipe D is provided with the perforations *a a* at those portions adjacent to the oil-fissures where steam is desired to be applied, and this steam may be supplied from any appropriate source and in any desired manner to the surface extremity of the pipe D. The force and amount of steam supplied to the pipe D may be regulated by a cock, or any appropriate equivalent device.

The source of, or method of, applying steam to the pipe D, forms no part of my invention, and may, therefore, be accomplished in any suitable manner.

When the veins or fissures in the oil-bearing rock become clogged with paraffine, steam is introduced by the pipe D, and, escaping at the perforations *a a*, which are provided at the proper points, heats and melts said paraffine, thus enabling the clogged fissures and veins to clear themselves, and consequently restoring or increasing the flow of oil.

I am aware that steam-pipes have heretofore been introduced into oil-wells for the purpose of clearing clogged fissures by means of steam heat, but in none of them am I aware of any provision whereby the steam may be projected directly against the portion or portions of the well desired to be acted upon, thus obviating the difficulties heretofore encountered from the condensation of the steam before it can reach the fissures, and the consequent loss of the essential heat.

I claim as my invention—

1. The pipe D, provided with perforations *a a*, whereby steam may be conveyed and directly applied to clogged veins and fissures of oil-wells, substantially as and for the purpose herein set forth.

2. The steam-pipe D, having perforations *a a*, in combination with the casing-head A, casing B, and tubing C, substantially as and for the purpose shown.

THOMAS B. $\overset{\text{his}}{\underset{\text{mark.}}{\times}}$ CAROTHERS.

Witnesses:

C. L. CATLIN,

E. J. PLIMPTON.